(12) United States Patent
Landerer

(10) Patent No.: US 8,789,312 B2
(45) Date of Patent: Jul. 29, 2014

(54) LOADING STATION

(75) Inventor: Roman Landerer, Sulzberg (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 836 days.

(21) Appl. No.: 12/315,039

(22) Filed: Nov. 26, 2008

(65) Prior Publication Data
US 2009/0145030 A1    Jun. 11, 2009

(30) Foreign Application Priority Data

Nov. 30, 2007   (DE) ..................... 20 2007 016 725 U

(51) Int. Cl.
*E06B 3/34* (2006.01)
(52) U.S. Cl.
USPC ............... 49/41; 49/40; 49/42; 49/67; 49/116
(58) Field of Classification Search
USPC ............ 49/40, 41, 42, 67, 68, 73.1, 116, 125; 109/3, 6–8, 12–17, 46, 67, 68
See application file for complete search history.

(56) References Cited

U.S. PATENT DOCUMENTS

| 4,235,045 A | * | 11/1980 | Nineberg | 49/41 |
| 4,545,630 A | * | 10/1985 | Izumi et al. | 312/285 |
| 5,353,457 A | * | 10/1994 | Chu | 5/640 |
| 5,605,014 A | * | 2/1997 | Kimura | 49/40 |
| 6,708,448 B2 | * | 3/2004 | Zappa | 49/41 |

FOREIGN PATENT DOCUMENTS

DE   299 19 268   1/2000
EP      1029631   11/2002

* cited by examiner

*Primary Examiner* — Katherine Mitchell
*Assistant Examiner* — Catherine A Kelly
(74) *Attorney, Agent, or Firm* — Dilworth & Barrese, LLP.

(57) ABSTRACT

The present invention relates to a loading station comprising a loading region which is accessible from a loading side and from a machine side and comprising two door elements movable along a guide from a machine position in which they release the machine side and close the loading side into a loading position in which they release the loading side and close the machine side, wherein the door elements overlap at least partially in the loading position and/or in the machine position so that, on an opening procedure of the machine side and/or of the loading side, the machine side and/or the loading side only starts to open when the respective other side has closed at least partially.

12 Claims, 5 Drawing Sheets

LOADING STATION

BACKGROUND OF THE INVENTION

The present invention relates to a loading station comprising a loading region which is accessible from a loading side and from a machine side.

Such loading stations are used e.g. with automatic handling systems or flexible machining cells to supply workpieces which are e.g. located on a pallet safely into the system for storage, machining or other handling. In this process, automated transport machinery or processing machinery are typically provided at the machine side, e.g. to automatically store the workpieces in a store or to machine them automatically at a processing machine.

The loading region in the loading station in accordance with the invention can be closed in this context toward the loading side and toward the machine side by door elements to prevent any injury of operating personnel. The door elements thus have a machine position in which they release the machine side and close the loading side and a loading position in which they release the loading side and close the machine side. In this way, the loading station works like a sluice which completely separates the loading side from the machine side in the machine position and in the loading position. It can hereby be prevented that persons working on the loading side enter the machine side or are injured by the machinery.

Such a loading station can naturally also be used for the separation of any desired two regions without machines necessarily having to work on the one side for this purpose. The loading station can thus e.g. be loaded by hand from the loading side and unloaded by hand from the machine side, with the door elements regulating the access between the two sides.

A loading station is known from DE 299 19 268 U1 in this connection in which the loading region can be closed in each case toward the loading side and toward the machine by a two-leaf door. In this connection, a lever is arrived on the loading side which has to be moved into a position for the opening of the door leaf at the machine side which is taken up by the door leaves on the load side in an open position and is thus blocked by them.

A loading station is furthermore known from EP 1 029 631 A1 in which a movable loading table is provided which can be moved to and fro from the loading side to the machine side and in so doing is in each case separated from the other side via door elements which can be folded up.

However, these loading stations are complex and/or expensive in construction and are not ideal in handling.

SUMMARY OF THE INVENTION

It is therefore the object of the present invention to provide a loading station which has a simple structure, is easy to operate and nevertheless ensures a safe separation of loading side and machine side.

This object is solved in accordance with the invention by a loading station in accordance with the description herein. Such a loading station has a loading region which is accessible from a loading side and from a machine side and two door elements which are movable along a guide from a machine position in which they release the machine side and close the loading side into a loading position in which they release the loading side and close the machine side. In this connection, the door elements overlap at least in part in the loading position and/or in the machine position so that, on an opening procedure of the machine side and/or of the loading side, the machine side and/or the loading side only starts to open when the respective other side has closed at least partially. Due to the door elements in accordance with the invention, which are movable along a guide, a construction results which is of particular simple structure and operation in which the two door elements each separate the loading side or the machine side from the loading region in dependence on the position. It is ensured in this context by the overlap of the door elements in at least one of the closed positions that the one side is already at least partly closed when the other side opens. It can hereby be prevented that operating personnel reach into the loading region or move through the loading region to the other side during the opening or closing procedure. The overlap in this connection advantageously takes place in that door elements arranged outwardly or inwardly with respect to the loading region are pushed next to one another along the guide.

If, in this connection, the door elements overlap at least partially in the loading position, it is ensured that the loading side is already at least partially closed when the machine side opens. If, in contrast, the door elements overlap in the machine position, it is ensured that the machine side is at least partially closed when the loading side opens. The door elements advantageously overlap in this connection both in the loading position and in the machine position to further increase the safety in the operation of the loading station.

In this connection, the door elements advantageously overlap so much in the loading position and/or in the machine position that the machine side and/or the loading side only starts to open when the respective other side has closed by at least 30%, advantageously by at least 50%. Increased safety already results hereby in that operating personnel does not reach into the loading region or does not move through the loading region onto the other side during the opening procedure or closing procedure.

The door elements, however, advantageously overlap so much in the loading position and/or in the machine position that the machine side and/or the loading side only starts to open when the respective other side has completely closed. It can hereby be ensured that the loading region is only accessible for operating personnel when it is already closed from the machine side or, vice versa, the loading region is only accessible from the machine side when it is no longer accessible from the loading side. It can hereby be precluded that operating personnel can be injured by a machine which simultaneously accesses the loading region. In addition, the loading station hereby works as a sluice which always only releases one of the two sides and thus completely separates the loading side from the machine side in every position of the door elements.

The door elements are advantageously movable along an arc of a circle in this context. Rigid door elements can hereby be used which can be moved in a guide in the shape of an arc of a circle, which results in a particularly simple and stable arrangement. Alternatively, a loading station would also be conceivable having door elements having a plurality of sections which are movable with respect to another and which are movable along a guide which then no longer necessarily has to be circular.

In this context, the door elements advantageously each take up at least one third of a circle and advantageously at least a half-circle. The door elements can hereby overlap in the loading position or in the machine position and can nevertheless close the complete side.

Further advantageously, each of the door elements can be moved on the movement from the loading position into the machine position and vice versa by more than 900, in particular by at least 1200 and advantageously by substantially 1800.

In particular when the two door elements can essentially be moved by 1800, each of the door elements can thus separate either the complete loading side or the complete machine side from the loading region depending on the position. For this purpose, each of the door elements advantageously takes up at least a half-circle.

Further advantageously, the movement of the two door elements is coupled in a compulsory manner. A safe opening and closing of the respective sides can be ensured here and human errors in operation can be precluded. The movement of only a single door element is sufficient in this process to open or close both door elements safely in accordance with the present invention. The door elements are advantageously moved in opposite directions by the compulsory coupling in this connection.

The compulsory coupling advantageously takes place in this connection via ring gears which are arranged at the door elements and which mesh with gears which are coupled to one another in a compulsory manner via an axle. A compulsory coupling of the door elements hereby results which is as stable as it is simple.

The axle advantageously runs in the base region or in the top region of the loading station in this connection, with the ring gears advantageously being arranged at the lower edge or at the upper edge of the door elements. A particularly simple and space-saving design hereby results.

Further advantageously, in accordance with the invention, the outer door element on the loading side has a handle via which both door elements can be moved Operation personnel can hereby open and close the loading station safely in that they move the outer door element from the machine position into the loading position. The inner door element is moved correspondingly in particular when a compulsory coupling is provided between the two door elements.

Further advantageously, in accordance with the invention, the door elements have viewing windows which overlap in the loading position and/or in the machine position such that a view is possible into the loading region through both viewing windows from the machine side and/or from the loading side. A view into the loading region can hereby be ensured for the operating personnel e.g. in the machine position despite the two overlapping door elements which separate the loading side from the loading region.

BRIEF DESCRIPTION OF THE DRAWINGS

The present invention will now be explained in more detail with reference to an embodiment and to the drawings. There are shown.

DESCRIPTION OF THE PREFERRED EMBODIMENTS

Figure 1:
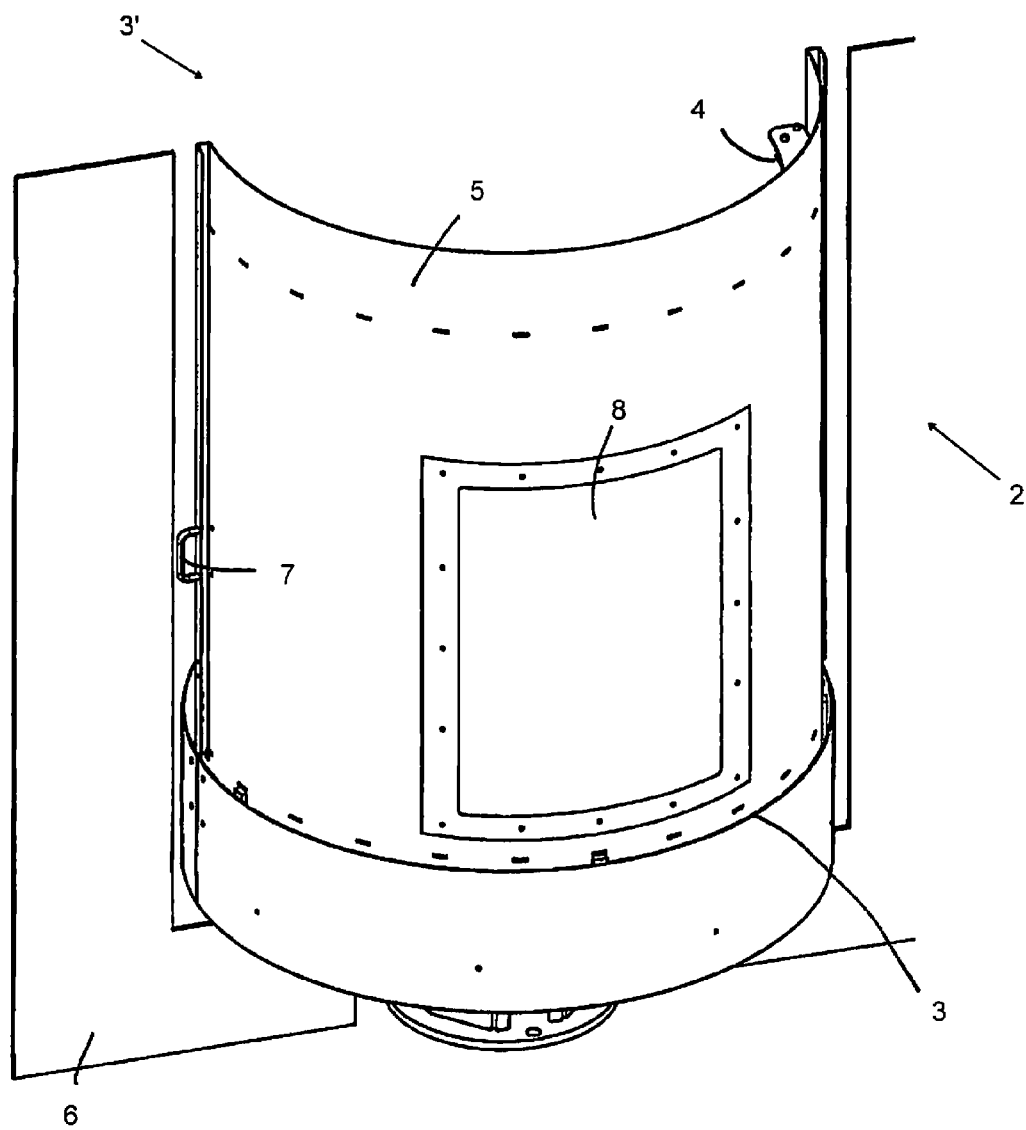
FIG. 1: an embodiment of the loading station in accordance with the invention in the machine position in which the door elements close the loading side and release the machine side.

FIG. 1 shows an embodiment of the loading station in accordance with the invention comprising a loading region 1 which is accessible from a loading side 2 and from a machine side 3' in dependence on the position of the door elements 4 and 5. The door elements thus have a machine position in which they release the machine side and close the loading side and a loading position in which they release the loading side and close the machine side. The loading station is integrated in this connection into a partition wall 6 which separates the loading side 2 from the machine side 3'. In this connection, the loading station forms a sluice between the loading side and the machine side and thus enables a safe transfer of objects from the loading region into the machine region and vice versa in that, in the loading position, objects are introduced into the loading region from the loading side, the door elements are moved into the machine position and the objects are then taken over from the loading region toward the machine side, and vice versa, without any danger of an injury to the operating personnel hereby being present by the machines arranged on the machine side. Equally, the loading station could also be used as a sluice between two mutually separate regions without machines being arranged on the machine side.

In accordance with the invention, the two door elements 4 and 5 can be moved along a guide 3 from the machine position in which they release the machine side 3' and close the loading side 2 into the loading position in which they release the loading side 2 and close the machine side 3. The two door elements 4 and 5 thus either close the loading side together or the machine side together depending on the position. Provision is now made in accordance with the invention for the two door elements 4 and 5 respectively to overlap in the machine position and in the loading position. In the machine position shown in FIG. 1 in which the door elements 4 and 5 release the machine side and close the loading side toward the loading region, both door elements 4 and 5 are arranged on the loading side in this connection and overlap here. The outer door element 5 which is movable along a guide at the outside with respect to the loading region therefore covers the inner door element 4 in FIG. 1 which is movable in a guide at the inside with respect to the loading region.

In accordance with the invention, the guide 3 in this connection has the shape of an arc of a circle along which the door elements 4 and 5 can be moved. In this connection, the door elements 4 and 5 substantially have the shape of a half-cylinder whose end faces are guided in the guide 3 arranged in the base region. The door elements take up slightly more than a half-circle in this connection so that they substantially completely overlap in the loading position and in the machine position and each of the door elements on its own would already completely close the respective side. On a movement from the loading position into the machine position or vice versa, the two door elements are then moved by substantially 180° in the opposite direction so that the door elements are completely arranged on the loading side in the machine position and are then moved substantially by 180° in the opposite direction in order then to be arranged completely on the machine side in the loading position.

Figure 2:
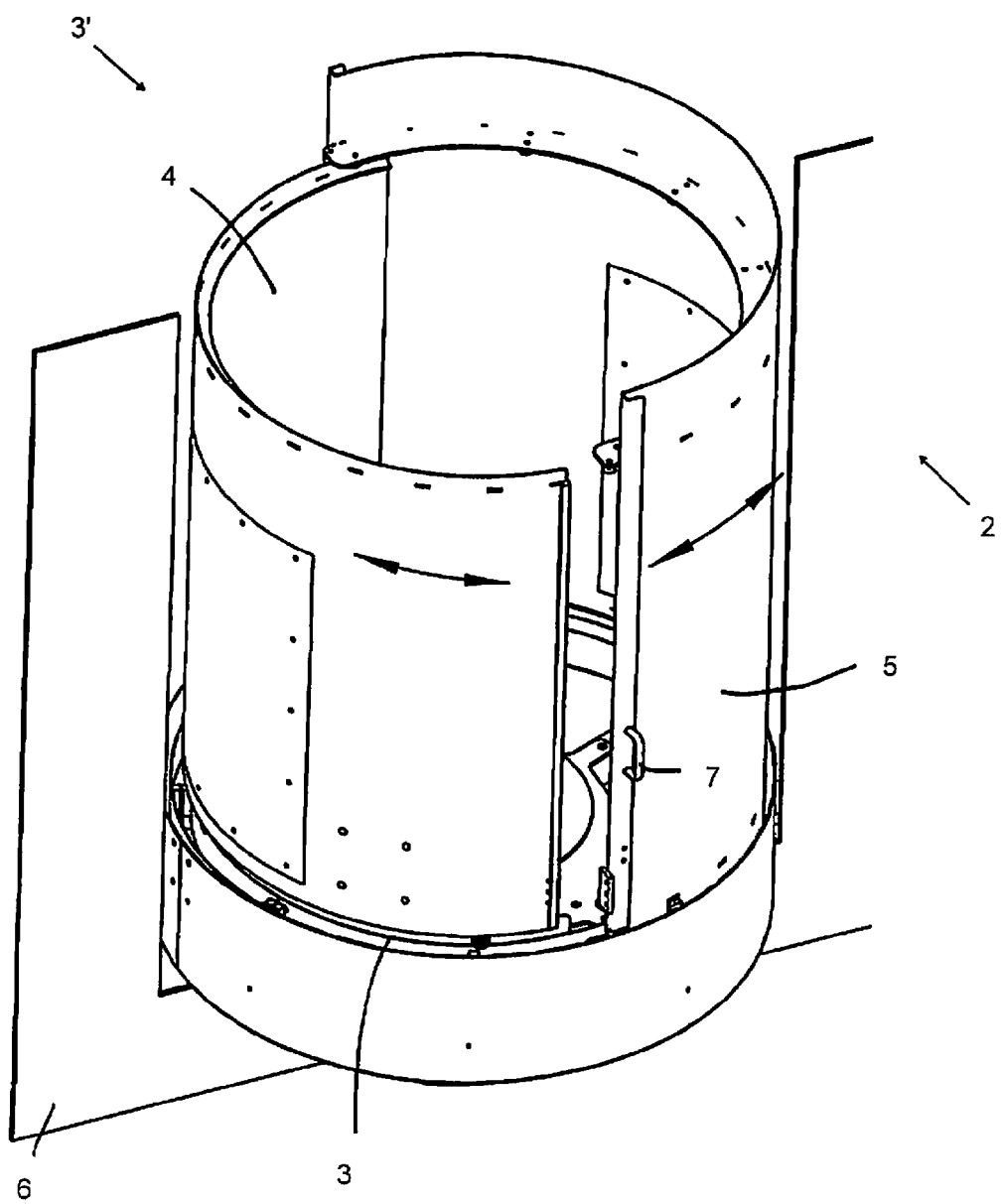
FIG. 2: the embodiment of the loading station in accordance with the invention in an intermediate position in which the machine side is already closed, while the loading side just starts to open.

In accordance with the invention, it is ensured by this overlap of the door elements 4 and 5 in the loading position or in the machine position that the machine side or the loading side only starts to open when the respective other side has already completely closed. FIG. 2 shows an intermediate position of the door elements 4 and 5 in this connection. In comparison with FIG. 1, the outer door element 5 was moved by approximately 90° counter clockwise; the inner door element was moved by approximately 90° clockwise.

In such an opening procedure of the loading side, the edges of the door elements 4 and 5 on the machine side arranged at the rear in FIG. 2 move toward one another to close it, while the door elements completely close toward the loading side 2 due to their overlapping arrangement. Only when, as shown in FIG. 2, the door elements 4 and 5 slightly overlap on the machine side and thus close the machine side with respect to the loading region does a gap open on the loading side 2 between the front edges of the door elements 4 and 5. Vice versa, a previous closing of the loading side 2 results on an opening of the machine side 3'.

Figure 3:
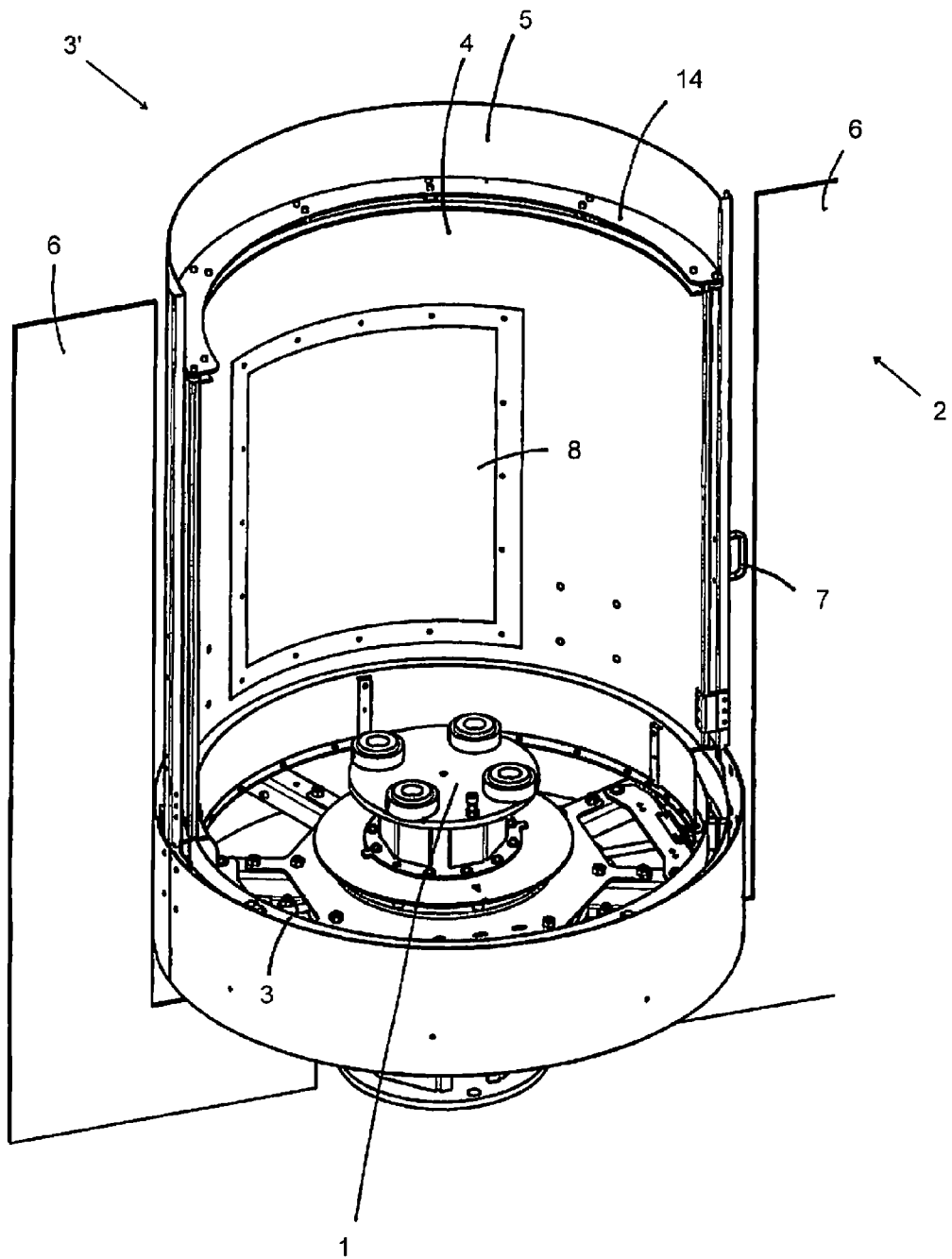
FIG. 3: the loading station in accordance with the invention in a loading position in which the door elements release the loading side and close the machine side.

The loading position is now shown in FIG. 3 in which the door elements 4 and 5 block the machine side 3' with respect to the loading region 1. In this context, a loading table is arranged centrally in the circular loading region 1 which is surrounded by the guide 3 for the door elements 4 and 5, with e.g. workpieces or pallets being able to be arranged on said loading table to be passed over from the loading side to the machine side. The two door elements 4 and 5 which substantially have the shape of a semi-cylinder run on rollers on guides 3 in the base region in this process. The outer door element 5 furthermore has a guide 14 in the ceiling region at which the inner door element 4 is supported.

The movement of the two door elements 4 and 5 is coupled in a compulsory manner in this connection such that the two door elements each move in opposite senses. The inner door element 4 can hereby also be moved along solely due to movement of the outer door element 5 to carry out the opening procedure or closing procedure in accordance with the invention. For this purpose, the outer door element has a handle 7 at the loading side 2 via which the loading station can be opened and closed.

The two door elements 4 and 5 in this connection both have viewing windows 8 which are each disposed above one another in the machine position and in the loading position such that a view is also possible from the loading side through to the loading region or to the machine side when the loading side is separated from the loading region by the door elements or the loading region is separated from the machine side by the door elements.

Figure 4:
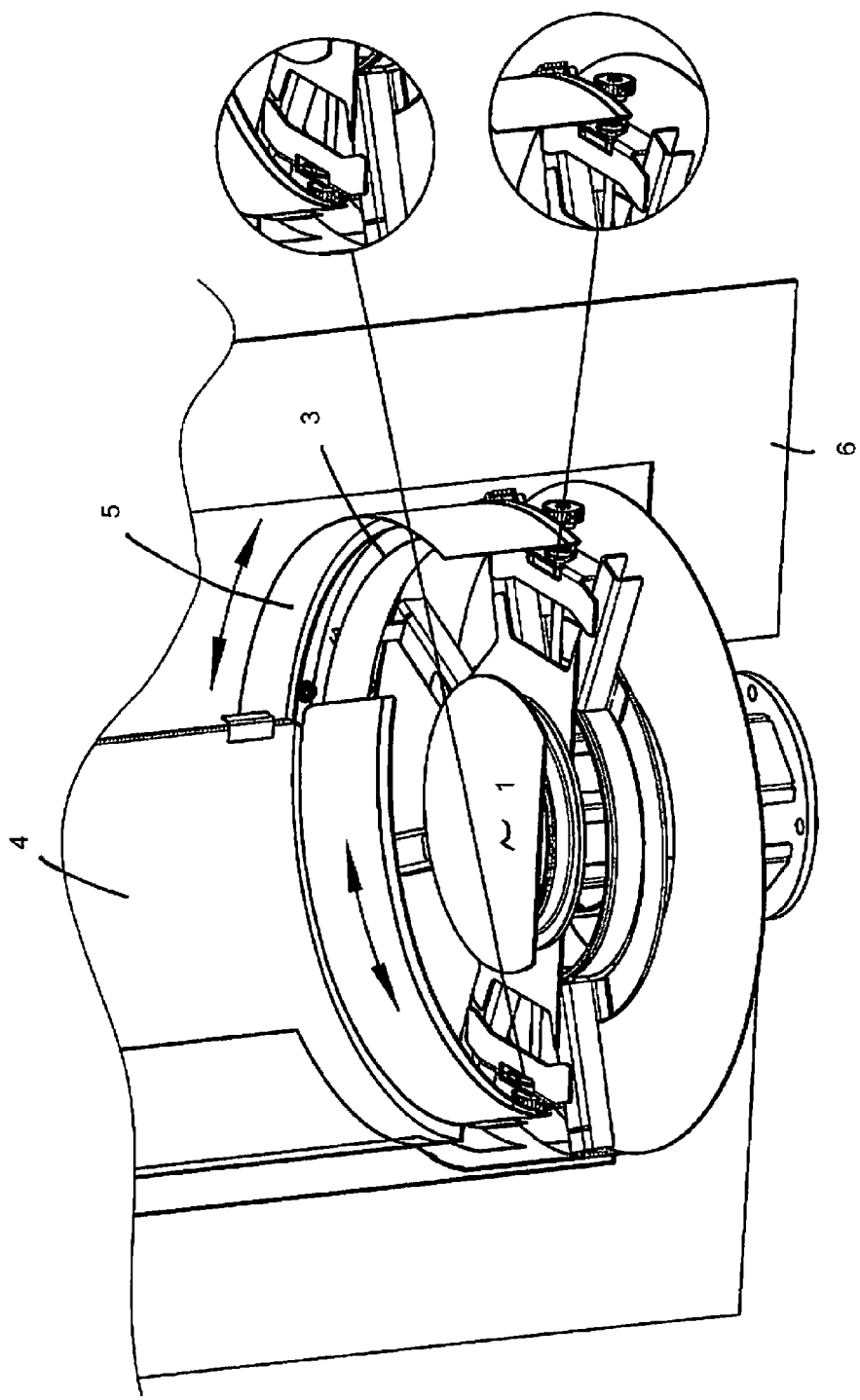
FIG. 4: the base region of the loading station in accordance with the invention with the guidance of the door elements and the compulsory coupling.

The base region of the loading station in accordance with the invention is now shown in more detail in FIG. 4. In this connection the guides 3 in the shape of an arc of a circle can be seen via which the inner door element 4 and the outer door element 5 are guided. The guides are arranged beneath the loading table in the base region of the loading station in this connection.

Figure 5:
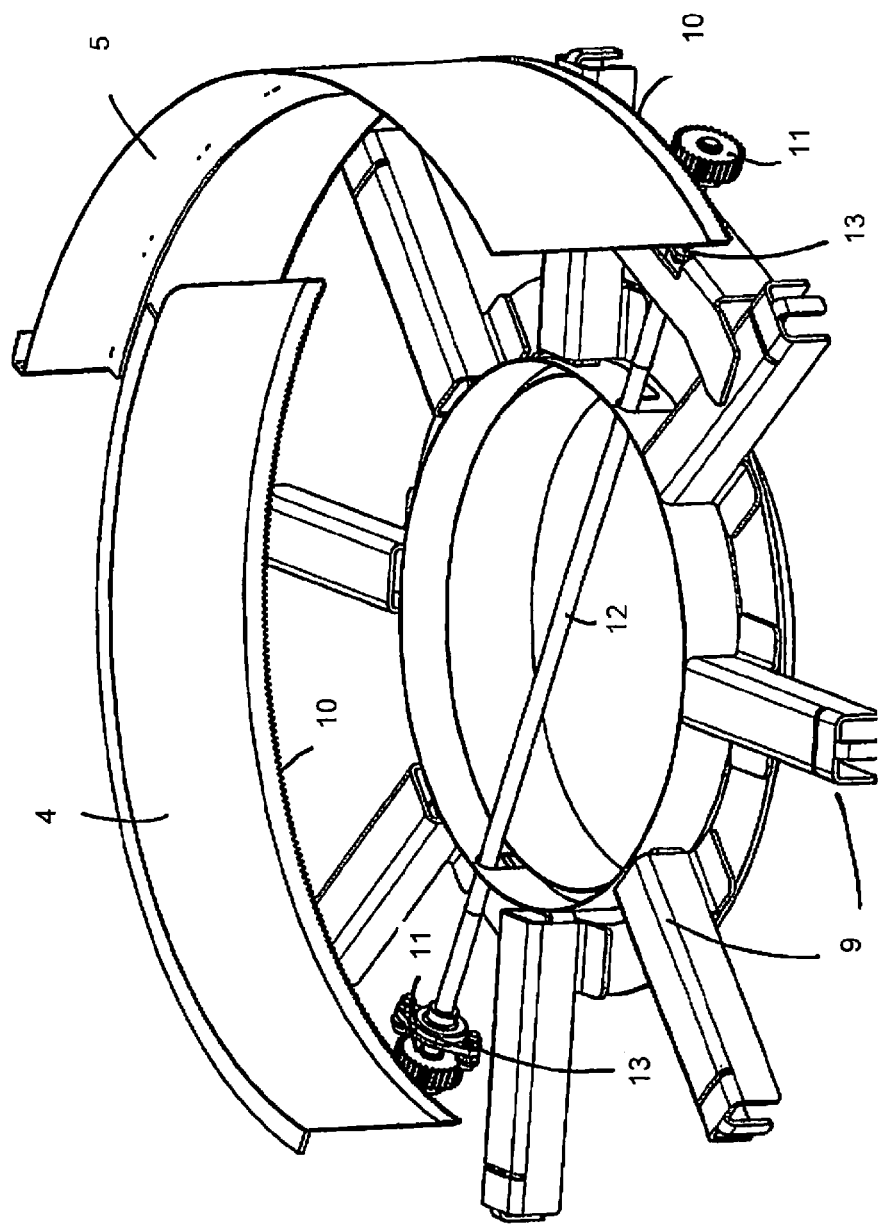
FIG. 5: a further view of the base region with the compulsory coupling of the door elements.

The compulsory guidance which is already shown in the enlarged sections in FIG. 4 can now also be seen enlarged again in FIG. 5. The door elements 4 and 5 have downwardly directed ring gears 10 at their lower edges which mesh with the gears 11. The gears 11 are arranged on oppositely disposed sides of the loading station and are connected via the axle 12 which is supported at support positions 13 at the base construction 9 of the loading station. If now the outer door element 5 is moved by hand e.g. clockwise, the ring gear arranged at the outer door element meshes with the gear 11 which transmits its rotary movement via the axle 12 onto the oppositely disposed gear which meshes with the ring gear 10 of the inner door element 4. The inner door element 4 is hereby moved in the opposite direction to the outer door element 5. That is, anticlockwise on a movement of the outer door element 5 clockwise.

The axle 12 which rigidly connects the ring gears 11 extends in this context transversely through the base region of the loading station through the center of the circle formed by the guides 3. Due to the compulsory coupling of the two door elements, the opening procedure or closing procedure in which the one side only opens when the other side is already closed is carried out without operating errors being able to occur since only the outer door element 5 can be moved by means of the handle 7.

It can thus be ensured in accordance with the invention that the loading region is only accessible for operating personnel when the machine side is already closed so that an injury to the operating personnel is excluded.

The invention claimed is:

1. A loading station comprising a loading region (1) which is accessible from a loading side (2) and machine side (3'), comprising:
   two door elements (4, 5), each of the door elements spanning at least a third of a circle and having a ring gear positioned at a lower edge thereof;
   a guide (3) on which the door elements (4, 5) are movably mounted and configured to simultaneously move the door elements about a common axis to one of a machine position in which the door elements (4, 5) open the machine side (3') and close the loading side (2) and a loading position in which the door elements (4, 5) open the loading side (2) and close the machine side (3'), and
   a coupling element coupling the movement of the door elements to each other, the coupling element having a first mesh gear and a second mesh gear positioned at opposing ends of an axel having a longitudinal axis traverse to the common axis about which the door elements move, the first mesh gear engaged with the ring gear of a first of the two door elements and the second mesh gear engaged with the ring gear of a second of the two door elements, the coupling element ensuring the door elements (4, 5) at least partially open only the machine side (3') or loading side (2) at any one time by controlling the door elements (4, 5) to at least partially overlap in the loading position or the machine position such that the machine side or the loading side (3', 2) only starts to open when the respective other side (2, 3') has closed at least partially,
   wherein each of the door elements is moved, on the movement from the loading position into the machine position, more than 90°.

2. A loading station in accordance with claim 1, wherein the door elements overlap so much in the loading or machine position that the machine or loading side only starts to open when the respective other side has closed by at least 30%.

3. A loading station in accordance with claim 1, wherein the door elements overlap so much in the loading or machine position that the machine or loading side only starts to open when the respective other side has completely closed.

4. A loading station in accordance with claim 1, wherein the door elements are movable along an arc of a circle.

5. A loading station in accordance with claim 1 wherein the axle runs in a base or top region of the loading station and the ring gears are respectively arranged at a lower or upper edge of the door elements.

6. A loading station in accordance with claim 1, wherein one of the door elements is an outer door element and has a handle at the loading side via which both door elements can be moved.

7. A loading station in accordance with claim 1, wherein each of the door elements includes a viewing window which overlap in the loading position or the machine position such that a view through the viewing windows is possible from the machine and loading side through to the loading region.

8. A loading station in accordance with claim 2, wherein the machine or loading side only starts to open when the respective other side has closed by at least 50%.

9. A loading station in accordance with claim 1, wherein each of the door elements spans at least a half-circle.

10. A loading station in accordance with claim 1, wherein each of the door elements is moved, on the movement from the loading position into the machine position, at least 120°.

11. A loading station in accordance with claim 10, wherein each of the door elements is moved, on the movement from the loading position into the machine position, substantially 180°.

12. A loading station in accordance with claim 1, wherein said loading and machine sides (2, 3') are situated on opposites sides from one another in the loading region (1).

\* \* \* \* \*